United States Patent
LeMoine et al.

(10) Patent No.: US 11,702,860 B2
(45) Date of Patent: Jul. 18, 2023

(54) COVER ASSEMBLY FOR AN ENCLOSURE

(71) Applicant: ShelterLogic Corp., Watertown, CT (US)

(72) Inventors: George LeMoine, Trumbull, CT (US); Christian M. Otis, New Haven, CT (US)

(73) Assignee: ShelterLogic Corp., Watertown, CT (US)

( * ) Notice: Subject to any disclaimer, the term of this patent is extended or adjusted under 35 U.S.C. 154(b) by 0 days.

(21) Appl. No.: 17/137,737

(22) Filed: Dec. 30, 2020

(65) Prior Publication Data

US 2021/0140192 A1    May 13, 2021

Related U.S. Application Data

(63) Continuation of application No. 16/228,933, filed on Dec. 21, 2018, now Pat. No. 10,900,252, which is a continuation of application No. 15/142,051, filed on Apr. 29, 2016, now Pat. No. 10,161,160.

(51) Int. Cl.
| | |
|---|---|
| *E04H 15/64* | (2006.01) |
| *A01K 1/00* | (2006.01) |
| *E04H 15/36* | (2006.01) |
| *E04H 15/54* | (2006.01) |

(52) U.S. Cl.
CPC .............. *E04H 15/64* (2013.01); *A01K 1/00* (2013.01); *A01K 1/0035* (2013.01); *A01K 1/0094* (2013.01); *E04H 15/36* (2013.01); *E04H 15/54* (2013.01)

(58) Field of Classification Search
CPC ...................................................... E04H 15/64
See application file for complete search history.

(56) References Cited

U.S. PATENT DOCUMENTS

| | | | | |
|---|---|---|---|---|
| RE26,363 | E * | 3/1968 | Mills, II ................. | B63B 17/02 114/364 |
| 3,683,427 | A * | 8/1972 | Burkholz ............... | E04H 4/108 52/80.1 |
| 4,038,727 | A * | 8/1977 | Robbins ................ | F16G 11/143 24/465 |
| 4,043,349 | A * | 8/1977 | Gays .................... | A47C 29/006 292/87 |
| 4,048,959 | A * | 9/1977 | Steele .................. | A01K 3/00 119/512 |
| 4,347,690 | A * | 9/1982 | Wallace, Jr. .......... | E04H 3/16 52/645 |
| 4,790,340 | A * | 12/1988 | Mahoney ............... | A47D 13/06 135/96 |
| 5,517,707 | A * | 5/1996 | LaMantia .............. | A47D 7/00 135/96 |

(Continued)

Primary Examiner — Noah Chandler Hawk
(74) Attorney, Agent, or Firm — Carmody Torrance Sandak & Hennessey LLP

(57) ABSTRACT

A canopy assembly for a barrier defined by at least two sides, wherein the canopy assembly including a cover assembly; and a bracket assembly, coupled to the cover assembly, wherein the bracket assembly includes at least a first bracket for coupling the cover assembly to the first side of the barrier and at least a second bracket for coupling the cover assembly to the second side of the barrier, wherein each of the at least first and second brackets have a cavity dimensioned to receive a plurality of differently dimensioned barrier top rails or wall surfaces.

5 Claims, 4 Drawing Sheets

(56) References Cited

U.S. PATENT DOCUMENTS

| | | | | |
|---|---|---|---|---|
| 5,802,778 | A * | 9/1998 | Thorp | E04H 15/008 52/36.2 |
| 6,073,587 | A * | 6/2000 | Hill | A01K 1/00 119/512 |
| 6,279,208 | B1 * | 8/2001 | Gillis | F16G 11/00 24/598.9 |
| 6,361,100 | B1 * | 3/2002 | Koester | B60J 7/085 296/100.18 |
| 6,367,496 | B1 * | 4/2002 | Rempel | E04H 15/58 135/93 |
| 6,431,794 | B1 * | 8/2002 | Zweber | F16B 7/048 248/231.71 |
| 6,453,624 | B1 * | 9/2002 | Hoffman | E04H 1/1205 52/63 |
| 6,539,966 | B2 * | 4/2003 | Raines, Jr. | E04H 15/001 135/96 |
| 6,606,964 | B2 * | 8/2003 | Marchioro | A01K 31/08 119/474 |
| 6,966,324 | B2 * | 11/2005 | Guido | E04H 15/64 24/265 AL |
| 7,931,038 | B2 * | 4/2011 | Jesus | B65F 1/16 135/88.16 |
| 7,931,287 | B2 * | 4/2011 | Dudding | B60G 11/113 280/124.175 |
| 8,082,700 | B2 * | 12/2011 | Kennedy | E04H 1/1205 135/124 |
| 9,635,833 | B2 * | 5/2017 | Oeltjen | A01K 1/034 |
| 2004/0089426 | A1 * | 5/2004 | Cosgrove | A01G 13/0225 160/135 |
| 2004/0211453 | A1 | 10/2004 | Guido | |
| 2007/0235068 | A1 * | 10/2007 | Green | E01F 13/022 52/63 |
| 2009/0071080 | A1 * | 3/2009 | Bourgain | E04H 1/1205 52/63 |

* cited by examiner

COVER ASSEMBLY FOR AN ENCLOSURE

BACKGROUND OF THE INVENTION

The present invention relates generally to coverings for enclosures, and in particular, to an improved canopy assembly for a barrier defined by at least two sides, wherein the canopy assembly comprises one or more brackets having a cavity dimensioned to receive a plurality of differently dimensioned barrier top rails or wall surfaces.

Accessories to cover enclosures are well known in the art. For example, U.S. Pat. No. 6,073,587 describes a modular animal shelter having a cover that utilizes a plurality of male end portions that connect with female receiving portions with an "insert fit," i.e. an end of one of the two members is received within an end of the other of the two members. As another example, U.S. Pat. No. 4,048,959 describes a mobile corral in which the roof is at least in part supported by support bars that are attached to the side rails by U-shaped saddles. Lastly, U.S. Publication No. 2004/0089426 describes the use of a structure that can extend above a barrier wall and secured thereto through the use of inverted "J" shaped saddle mounts.

However, it is believed that deficiencies still exist in the state of the art. For example, the aforementioned known roof, covering and/or extension assemblies are limited in their ability to receive a plurality of differently dimensioned barriers, especially because of the 90° angles of the brackets used therewith. The closest known attempt to achieve the foregoing objective is through the use of tightening screws, an example of which is described and illustrated in the aforementioned U.S. Publication No. 2004/0089426, but which of course increases the number of needed components and which still limits the versatility to accommodating only different thicknesses of the rectangular barrier wall. That is, the prior art is deficient, and the use of such tightening screws makes such deficiency clear in that the prior art brackets cannot accommodate and are not dimensioned to receive a plurality of differently dimensioned barrier top rails or wall surfaces while being able to maintain lateral stability of such rails and/or wall surfaces. That is, in the prior art, such rails and/or wall surfaces would not be laterally constrained within the cavity of such prior art brackets.

Accordingly, still further developments in the art are desirable. For example, it would be advantageous to provide a canopy assembly for a barrier in which the bracket assembly is provided with brackets, which themselves are shaped to receive a plurality of differently dimensioned barrier top rails or wall surfaces and which maintain lateral stability of and laterally constrain such rails and/or wall surfaces.

It has thus been discovered that improved brackets are achievable and provided by the present invention, and it is further believed that the present invention overcomes the perceived deficiencies in the prior art as well as provides the objectives and advantages set forth above and below.

OBJECTS AND SUMMARY AND OBJECTIVES OF THE INVENTION

Therefore, it is an objective and advantage of the present invention to provide an improved canopy assembly that overcomes the perceived deficiencies in the prior art.

For example, it is an objective and advantage of the present invention to provide an improved canopy assembly that is able to receive a plurality of differently dimensioned barrier top rails or wall surfaces. The term "dimensioned" with respect to the barrier top rails or wall surfaces used throughout this application is meant to mean both in shape (e.g. circular, oval, etc.) and/or size (e.g. large or small, etc.).

In particular, it is an objective and advantage of the present invention to provide an improved canopy assembly that utilizes brackets that are dimensioned to receive a plurality of differently dimensioned barrier top rails or wall surfaces. Similarly, the term "dimensioned" with respect to the cavity of the bracket as disclosed herein is meant to mean both with respect to the angles of the inner side walls (as disclosed below) and/or size (e.g. large or small, etc.).

In particular, it is an objective and advantage of the present invention to provide such brackets to receive a plurality of differently dimensioned and conventional barriers and which maintain lateral stability of by laterally constraining such rails and/or wall surfaces when received thereby.

That is, it is an objective and advantage of the present invention to provide such canopy assemblies that can be retrofitted with a plurality of differently dimensioned and conventional barriers. For example, the brackets of the present invention are not specially adapted to be used with any single and particularly shaped or sized conventional barrier, thereby allowing any canopy assembly of the present invention to be used with and receive more than one conventionally and differently dimensioned barrier, such as a fence or wall, and which still maintain lateral stability and laterally constraining of such rails and/or wall surfaces.

Yet another objective and advantage of the present invention is to provide an improved canopy assembly that provides temporary shelter for animals, such as horses by way of example and not limitation, from sun and light precipitation.

Still another objective and advantage of the present invention is to provide a tensioning system to further secure the canopy assembly to the barrier.

Yet another objective and advantage of the present invention to provide such a canopy assembly that can easily adapt to a plurality of barrier widths and lengths, thereby accommodating a plurality of enclosure dimensions.

Further objects and advantages of this invention will become more apparent from a consideration of the drawings and ensuing description.

The invention accordingly comprises the features of construction, combination of elements, arrangement of parts and sequence of steps that will be exemplified in the disclosure hereinafter set forth, and the scope of the invention will be indicated in the claims.

To overcome the perceived deficiencies in the prior art and to achieve the objects and advantages above and below, the present invention in a first preferred embodiment, is generally speaking, directed to a canopy assembly for a barrier defined by at least two sides, wherein the canopy assembly comprises a cover assembly; and a bracket assembly, coupled to the cover assembly, wherein the bracket assembly comprises at least a first bracket for coupling the cover assembly to the first side of the barrier and at least a second bracket for coupling the cover assembly to the second side of the barrier, wherein each of the at least first and second brackets have a cavity dimensioned to receive a plurality of differently dimensioned barrier top rails or wall surfaces.

In a specific preferred embodiment, the enclosure is one for horses.

BRIEF DESCRIPTION OF THE DRAWINGS

The above set forth and other features of the invention are made more apparent in the ensuing Description of the Preferred Embodiments when read in conjunction with the attached Drawings, wherein.

Like numbers to identify like parts and features will be used among the various figures, but not all features will be specifically identified in each illustration.

DETAILED DESCRIPTION OF THE PREFERRED EMBODIMENTS

Figure 1:
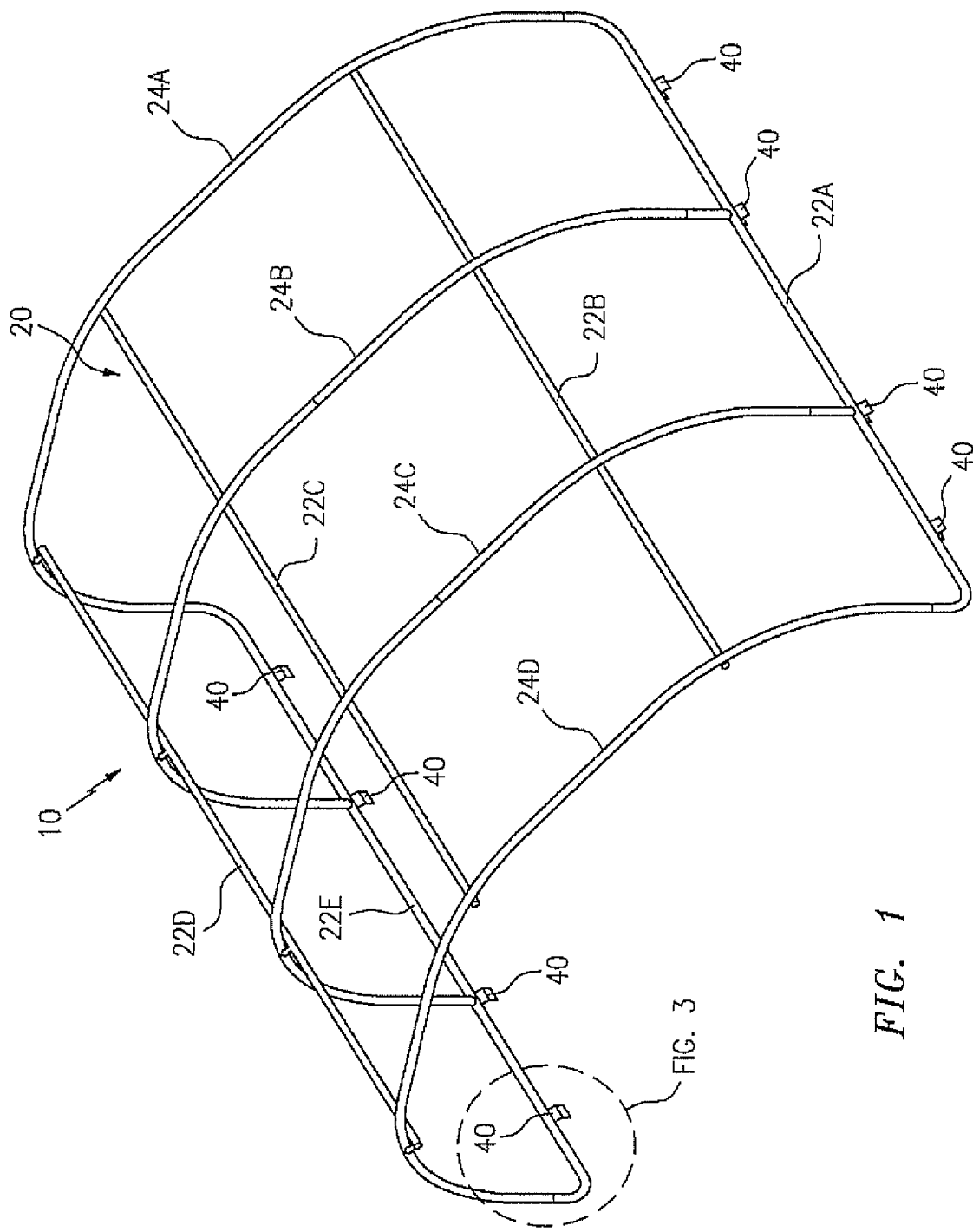
FIG. 1 is a perspective view of a canopy assembly constructed in accordance with a preferred embodiment of the present invention.

Generally speaking, in a preferred embodiment, the present invention may be advantageously designed as a steel structural frame assembly for a temporary shelter for animals from sun and light precipitation comprised of a plurality of rib sections mounted to fixed, assembled rails with bracket attachment locations to existing horse panels. Advantageously, attachment brackets, preferably also made of steel, may be constructed in a way that the frame assembly can be lifted and placed on existing horse panels. The brackets are preferably utilized in such a way to accept a plurality of different panel cross sectional shape and/or size profiles. Moreover, if desired, such brackets can be further secured by using ratchets or any other conveyance connected to ground anchors. A fabric material may be used to cover the structure, with ratchets or other conveyances used to tension the cover, as well as provide an additional attachment to the existing panels.

In a specific embodiment, the structure may be designed for a 12'x12' unit, yet the features and construction of the present invention lends itself to being easily adaptable to a plurality of sizes. For example, additional straight sections of tube may or may not be used to adjust the overall width of the canopy assembly. Alternatively (or in addition), additional rib sections of tube may or may not be used to adjust the overall length of the canopy assembly. As would be understood by those skilled in the art, each additional rib subassembly may require additional tubes and brackets for installation.

As will be more specifically discussed below, brackets constructed in accordance with preferred embodiments may (or may not) include an elastomeric material as a liner for contacting the existing barrier panels. The material may, for example, be a soft durometer and/or may adhere to the bracket(s) using adhesive. Brackets constructed in accordance with preferred embodiments may also contain an area (e.g. a slot) for usage as an anchor strap or other method of attachment location. The brackets may also be permanently affixed to the tubes of the cover (e.g. rail) assembly (e.g. by welding or the like). The positioning of the brackets along the bottom of the canopy assembly advantageously allow additional ribs to be installed in the middle of the structure, up to for example and not limitation, four feet rib spacing.

As will also be understood by one skilled in the art, a cover of any size can be made to cover the plurality of sizes of canopy assemblies that are contemplated herein. In a preferred embodiment, the cover does not cover the existing barrier panels, but preferably only the canopy assembly itself.

And as but yet another feature of the present invention, the use of ratchets or other conveyances to tension the canopy assembly may be utilized. Preferably, if used, the ratchet itself is placed towards the outside of the barrier structure so as to not interfere with the inner enclosure occupied by an animal therein. Also preferably, all anchors and straps are placed in a way to eliminate or at least minimize chances of damage to the barrier, the enclosure, the canopy assembly and/or the animal enclosed therein and protected thereby.

With the general disclosure of certain features of the present invention having been made above, reference is now made to FIGS. 1-6 for a more detailed disclosure of the preferred embodiments of the present invention.

For example, in accordance with a first embodiment, a canopy assembly, generally indicated at 10, constructed in accordance with a first embodiment, is provided. Generally speaking, canopy assembly 20 comprises a cover assembly, generally indicated at 20, which in a preferred embodiment, comprises a rail assembly made up of a plurality of horizontal rail assemblies 22A, 22B, 220, 22D and a plurality of arch rail assemblies 24A, 24B, 240 and 24D. Such horizontal rail assemblies and arch rail assemblies may be made up of one or more sections as would be known in the art, such as for example, from a reading of U.S. Pat. No. 7,296,584, the disclosure of which is incorporated by reference herein for this disclosure. Preferably, a fabric material, generally indicated at 50 in FIG. 5, may be provided to cover assembly 20, with ratchets or other conveyances used to tension the cover 50 as would be well understood in the art.

Canopy assembly 10 also comprises a bracket assembly coupled to the cover assembly 20, In a preferred embodiment, the bracket assembly preferably comprises at least two (2), but preferably at least four (4), brackets, each generally indicated at 40. An exemplary bracket 40 is shown more particularly in FIG. 4. Each bracket 40 is provided to assist coupling the cover assembly 20 to the barrier. As will be disclosed in greater detail below, each of the brackets 40 are preferably dimensioned to receive a plurality of differently dimensioned (shaped and/or sized) barrier rail tops and/or wall surfaces.

Figure 2:
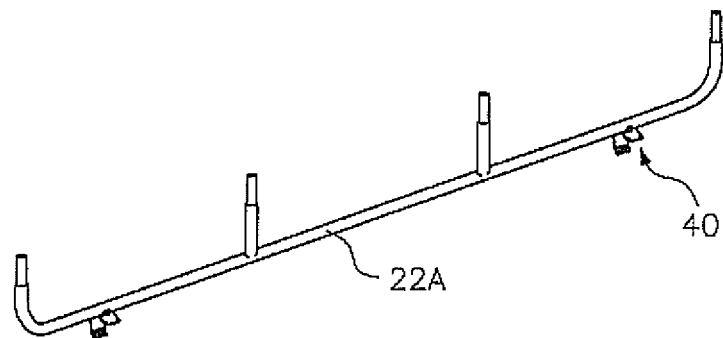
FIG. 2 is perspective view of a section of the canopy assembly constructed in accordance with the preferred embodiment of FIG. 1.
Figure 3:
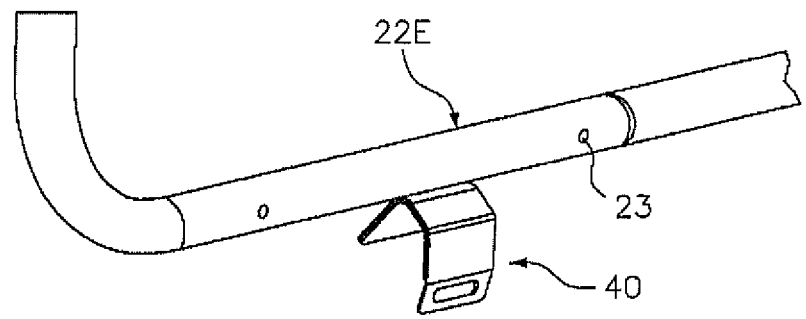
FIG. 3 is perspective view of a close-up portion of the canopy assembly shown in FIG. 1.

FIGS. 2 and 3 illustrate bracket 40 a bit more closely, while FIG. 3 for example illustrates how rail assembly 22E may be sectionally joined, with a spring pin 23 provided to interlock sections of rail assembly 22E. In a preferred embodiment, each of the steel brackets 40 are preferably welded to the respective steel rail assembly location to provide maximum structural integrity.

Figure 4:
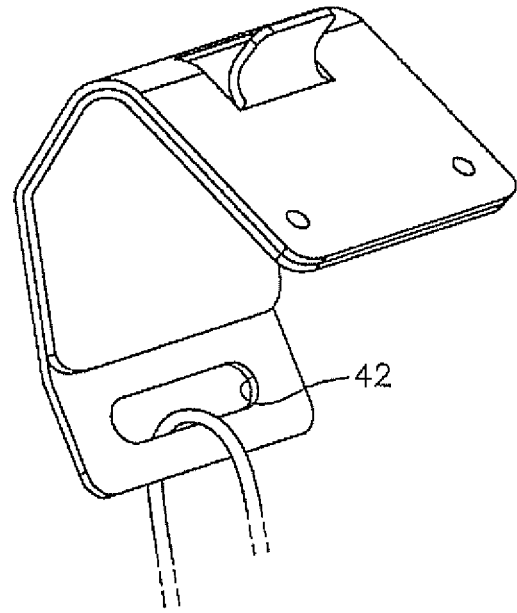
FIG. 4 is perspective view of a bracket constructed in accordance with a preferred embodiment of the present invention.
Figure 5:
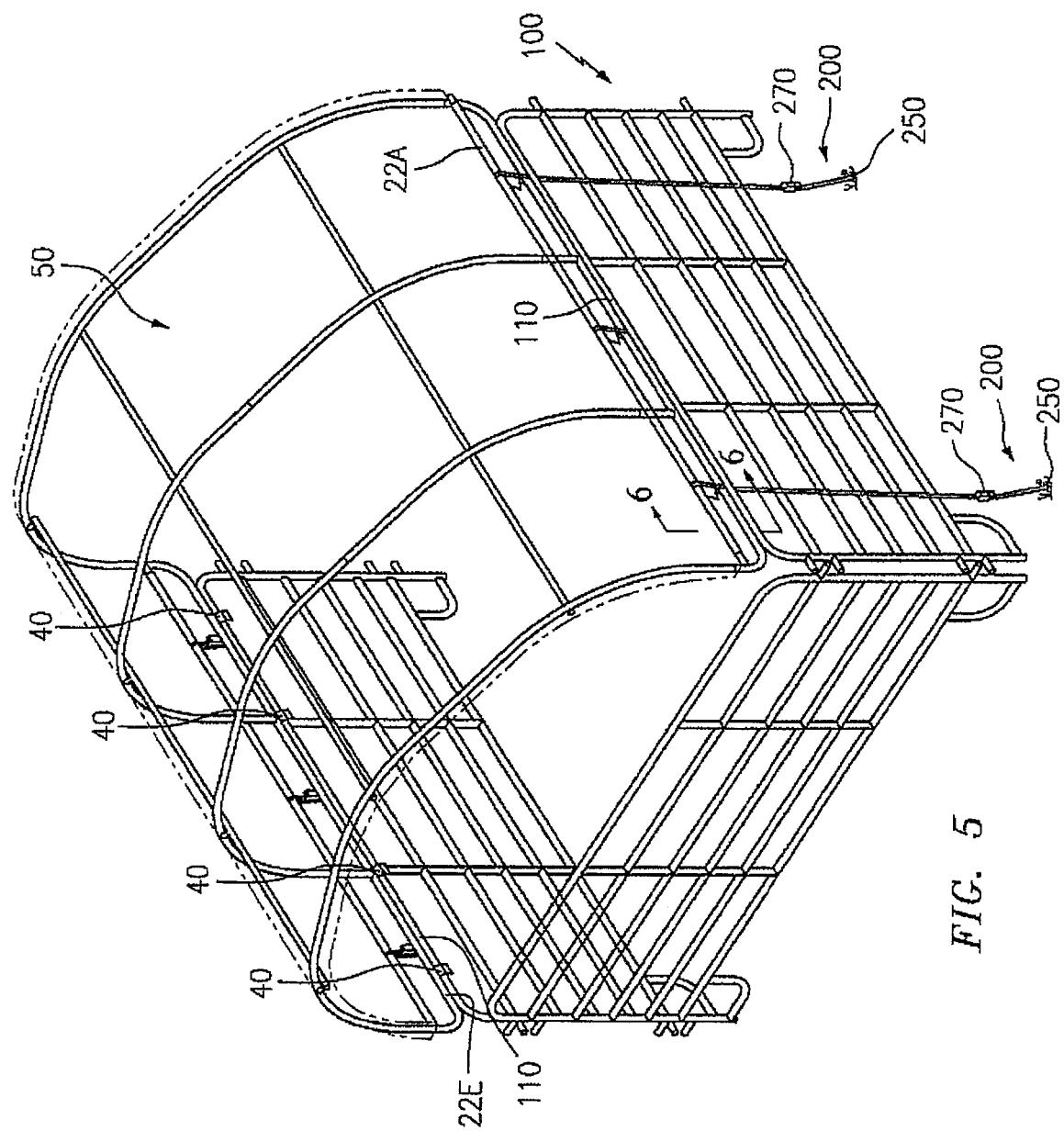
FIG. 5 is a perspective view of the canopy assembly constructed in accordance with a preferred embodiment of the present invention illustrated in FIG. 1, mounted atop a conventional barrier in the form of a conventional horse fence enclosure.
Figure 6:
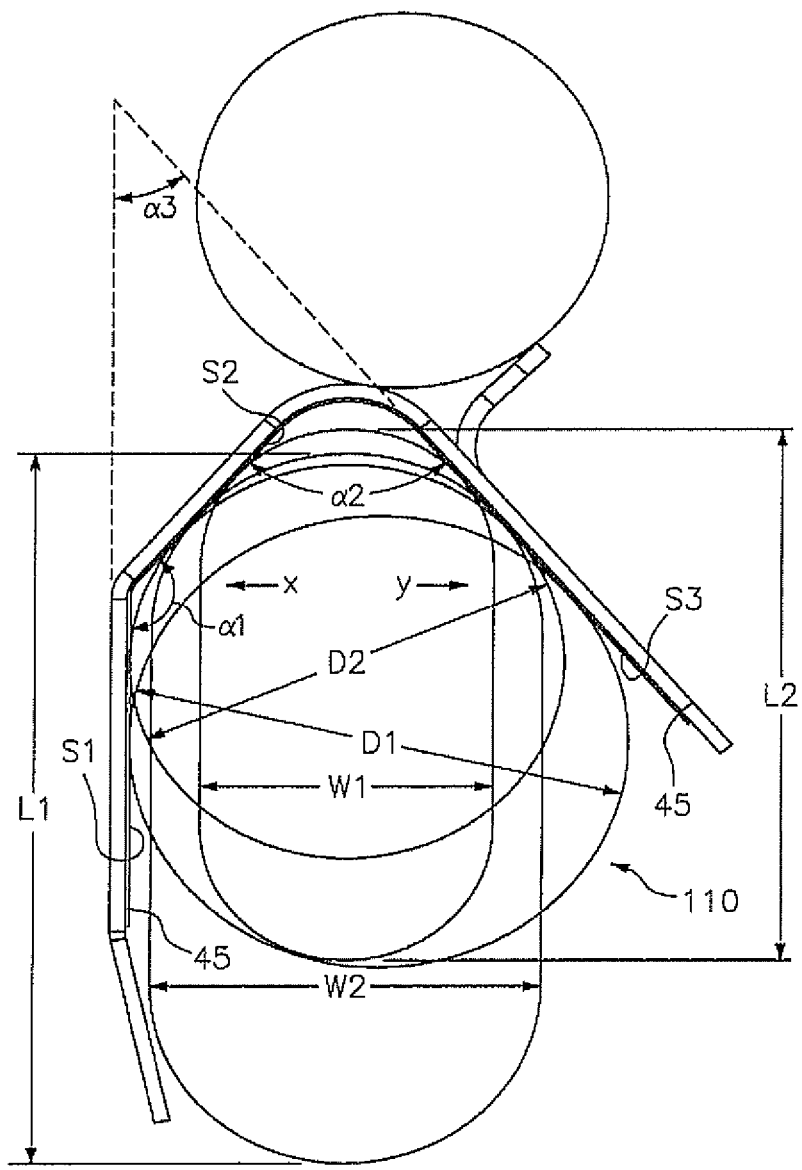
FIG. 6 is a cross-sectional view taken about lines 6-6 of FIG. 5, illustrating among other things, various and differently dimensioned barrier top rails and/or wall surfaces all being received in the cavity of a bracket constructed in accordance with preferred embodiments of the present invention.

Reference is now made to FIGS. 4-6 for a more detailed disclosure of a preferred bracket construction. Preferably, each of the brackets 40 is of a general "U-shape" in that each bracket is shaped to engage a plurality of differently dimensioned top edges of a barrier, generally indicated at 100, which may be, for example and not limitation, a fence comprised of piping or rails (herein generically referred to as "rail(s)"). The topmost rail, indicated by reference number 110 can be of different dimensions, which is to be interpreted herein as including different sizes and/or shapes, as more particularly illustrated in FIG. 6. For example, FIG. 6 illustrates topmost rail 110 taking different dimensions of sizes (e.g. different circular cross-sections of diameter $D_1$ and $D_2$, as well as oval cross-sections having lengths/widths $L_1 \times W_1$ and $L_2 \times W_2$) as well as shapes (i.e. FIG. 6 showing that the topmost rail can be of a circular cross-section or an oval cross-section, by way of example). To be sure, the barrier 100 could also be a wall of some sort, and the present invention, as disclosed herein, can accommodate this embodiment as well.

The ability to accommodate different size and/or shaped top rails 110 is due to the unique shape of bracket 40. That is, as best seen in FIG. 6, bracket 40 is preferably comprised of at least two (2) interior surfaces $S_1$, and $S_3$, which if such surfaces were extended, would meet at angle $\alpha_3$, as illustrated. In a preferred embodiment, this angle $\alpha_3$ is between 30°-80°, and in a specifically preferred embodiment, angle $\alpha_3$, is about 40°.

However, in another preferred embodiment, bracket 40 also preferably comprises at least a $3^{rd}$ interior surface denoted $S_2$, joining surfaces $S_1$ and $S_3$ at angles $\alpha_1$ and $\alpha_2$ as illustrated. Preferably the angles of $\alpha_1$ and $\alpha_2$ are about 140° and about 80°, respectively. An advantage of having the $3^{rd}$ wall/surface $S_2$ is to allow the bracket to seat closer to the vertical axis of the attached tube.

The corral panels used function better structurally when the pin connections are at a maximum, that is, "in tension". Limiting $S_2$'s angle in relation to $S_1$ ($\alpha_1$) transmits a small horizontal load in the outboard direction to assist the corral panels to stay in the maximum position. By placing the position of the attached rail slightly inboard to the theoretical centers of each size and shape, the bracket ensures this particular case of loading. By limiting the horizontal placement of each profile of tube, the vector of force in the horizontal direction due to the weight of the structure is minimized. The location of wall $S_2$ also prevents opposite horizontal loading towards the inboard side.

It can be seen that the foregoing design is in patentable distinction to the 90° angles of the "J" shaped bracket of U.S. Publication No. 2004/0089426, this latter bracket being clearly limited in its ability to be secured to differently dimensioned (i.e. in size and/or shape) railings, posts and/or top wall edges of a barrier structure (and described in the '426 application as being limited as such without the use of tightening screws 135). That is, as should now be understood, the prior art designs (e.g. a conventional "U-shape" or "J-shape" bracket) are unable to provide lateral stability and lateral constraint of such rails and/or wall surfaces when secured within the bracket 40 as shown in FIG. 6. That is, as illustrated in the figures, most notably FIG. 6, any sized/shaped pipe, rail or wall surface received within bracket 40 will always be provided with lateral stability and constraint even if only secured against two of the three walls due to most significantly the selection of angle $\alpha_3$ and second most importantly by the selection of angle $\alpha_2$, with the preferred selections being as noted above.

By "lateral stability" and/or "lateral constraint" it is intended to mean the lack of the ability of the pipe to move in either horizontal direction, as indicated by the "X" and "Y" arrows in FIG. 6.

With the invention so constructed, the bracket design of the present invention can accommodate different sized and dimensioned circular, oval and/or rectangular cross-sections of pipes or rails.

To further assist in securing canopy assembly 10 to barrier 100, an anchoring assembly, generally indicated at 200, comprising one or more ground anchors 250, may be provided. In a preferred embedment, each bracket 40 taking advantage of the anchoring assembly 200 comprises a slot 42 for coupling the brackets 40 to said one or more anchors 250. A ratchet assembly, generally indicated at 270 may also be provided in connection with each bracket 40 to assist in tightening and maintaining each of the brackets 40 against the respective topside edges (e.g. rails, wall, or the like) of barrier 100.

Each bracket may also comprise a liner 45 (FIG. 6) comprised of an elastomeric material that engages the outer surface of the top rail 110 of barrier 100 when the bracket 40 is coupled thereto. Liner 45 may be comprised of a soft durometer material and/or may adhere to the inner surface of bracket 40 using adhesive. Preferably (but not necessarily) all of the brackets are identically constructed, e.g. they all include a liner 45 or they all do not and/or all the brackets 40 comprise slot 42 or they all do not.

It can thus be seen that the present invention provides a canopy assembly that can be more universally used with various constructions of barriers, such as horse fences and the like. That is, the canopy assembly as disclosed and claimed herein is applicable and able to be used with, secured to and receive multiple conventional barrier top rails (and/or wall surfaces), and horse fences as just but one example. Importantly, the claimed canopy assembly, with the unique bracket design, is able to be used with a range of conventional barriers, and horse fences are but one example, that were not designed nor manufactured with the use of any particular canopy assembly in mind (or at least not one as versatile as that disclosed and claimed herein). That is, the ability of the disclosed and claimed canopy assembly, based on the uniquely shaped brackets, to be able to mount and be secured to a plurality of conventional and multidimensional (i.e. in shape and/or size) barriers in a manner that provides for improved lateral stability regardless of the size/shape barrier wall/rail secured thereto, thus making the present invention highly advantageous and superior to prior art canopy designs for similar purposes. Moreover, the incorporation of the anchoring assembly to help tension the brackets and thus the canopy assembly to the barrier provides additional structural integrity to the overall enclosure structure formed thereby. Moreover, it should be clear that by "conventional" it is meant that the barriers used herewith were not designed or manufactured with the use of the claimed canopy assembly in mind, i.e. without a particular shaped or sized top rail 110 cross-section.

While the invention has been particularly shown and described with respect to preferred embodiments thereof, it will be understood by those skilled in the art that changes in form and details may be made therein without departing from the scope and spirit of the invention.

What is claimed is:

1. A combination canopy assembly and a barrier for sheltering animals, wherein the barrier is defined by at least two sides, wherein the barrier comprises a plurality of rails and wherein the canopy assembly comprises a cover assembly comprising a rail assembly comprising a plurality of horizontal rail assemblies and a plurality of arch rail assemblies; and wherein the canopy assembly comprises a bracket assembly, coupled to the cover assembly for coupling the cover assembly to the barrier, wherein the bracket assembly comprises:

at least a first bracket for coupling the cover assembly to the first side of the barrier and at least a second bracket for coupling the cover assembly to the second side of the barrier, wherein the at least first and second brackets have a cavity created by at least a first interior surface (S1), a second interior surface (S2), and a third interior surface (S3), the first interior surface (S1) and the second interior surface (S2) meet at a first angle ($\alpha_1$) that is about 140° and the second interior surface (S2) and the third interior surface (S3) meet at a second angle ($\alpha_2$) that is less than 90°, and wherein the cavity of each respective at least first and second brackets is configured to laterally constrain a plurality of differently dimensioned barrier top rails or wall surfaces of the barrier when the canopy assembly is coupled to the barrier top rails or wall surfaces of the barrier.

2. The combination canopy assembly and barrier as claimed in claim 1, wherein the barrier is defined by at least three sides.

3. The combination canopy assembly and barrier as claimed in claim 1, wherein the two interior surfaces (S1) and (S3) of the at least first and second brackets are orientated such that, if they were extended, they would meet at a third angle ($\alpha_3$) between 30°-80°.

4. The combination canopy assembly and barrier as claimed in claim 3, wherein the third angle ($\alpha_3$) is about 40°.

5. The combination canopy assembly and barrier as claimed in claim 1, wherein at least one of the at least first and second brackets comprises a liner comprised of an elastomeric material that engages a surface of the barrier top rail or wall surface when the at least one bracket comprising the liner is coupled thereto.

* * * * *